United States Patent
Shirai

(10) Patent No.: US 8,780,388 B2
(45) Date of Patent: Jul. 15, 2014

(54) PRINTING APPARATUS, SERVER, PRINTING SYSTEM, CONTROL METHOD FOR PRINTING APPARATUS, AND STORAGE MEDIUM STORING CONTROL PROGRAM THEREFOR

(75) Inventor: Toshiaki Shirai, Tokyo (JP)

(73) Assignee: Canon Kabushiki Kaisha (JP)

( * ) Notice: Subject to any disclaimer, the term of this patent is extended or adjusted under 35 U.S.C. 154(b) by 640 days.

(21) Appl. No.: 13/026,618

(22) Filed: Feb. 14, 2011

(65) Prior Publication Data
US 2011/0199640 A1  Aug. 18, 2011

(30) Foreign Application Priority Data
Feb. 15, 2010 (JP) ................................. 2010-030097

(51) Int. Cl.
*G06F 3/12* (2006.01)

(52) U.S. Cl.
CPC .............. *G06F 3/1204* (2013.01); *G06F 3/129* (2013.01); *G06F 3/1258* (2013.01)
USPC ...................................................... 358/1.15

(58) Field of Classification Search
CPC ...... G06F 3/129; G06F 3/1258; G06F 3/1204
See application file for complete search history.

(56) References Cited

U.S. PATENT DOCUMENTS

| | | |
|---|---|---|
| 2005/0027483 A1 | 2/2005 | Ikeda et al. |
| 2009/0025015 A1* | 1/2009 | Kurabayashi ................. 719/327 |

FOREIGN PATENT DOCUMENTS

JP   2005-049950 A   2/2005

* cited by examiner

*Primary Examiner* — Saeid Ebrahimi Dehkordy
*Assistant Examiner* — Lennin RodriguezGonzale
(74) *Attorney, Agent, or Firm* — Rossi, Kimms & McDowell LLP

(57) ABSTRACT

A printing apparatus, which is capable of making effective use of the extended setting set up once without performing the extended setting each time, and is capable of improving user's convenience. A printing apparatus is connected to an information processing apparatus that instructs printing execution, is connected to a server via a network, and executes printing according to a print job generated by the information processing apparatus. A request unit requests an extended print setting from the server when receiving a request of the extended print setting that extends a predetermined basic print setting from the information processing apparatus. A holding unit holds extended print setting information showing the extended print setting corresponding to the printing apparatus received from the server in response to the request. A sending unit sends the extended print setting information held by the holding unit to the information processing apparatus.

8 Claims, 19 Drawing Sheets

FIG.9

SERVER ID:00000AAA1026

| DEVICE NAME | MODEL | IP ADDRESS | SUBNET MASK |
|---|---|---|---|
| PRINTER | LBP8000 | 192.168.0.12 | 255.255.255.0 |
| MFP | iR3000 | 192.168.13.11 | 255.255.255.0 |

FIG.17

```
JOB ID

BASIC SETTING
    SHEET SIZE=A4
    SHEET TYPE=PLAIN PAPER
    SHEET ORIENTATION=PORTRAIT
    NUMBER OF COPIES=2
        :

PRINTING DATA
```

PRINTING APPARATUS, SERVER, PRINTING SYSTEM, CONTROL METHOD FOR PRINTING APPARATUS, AND STORAGE MEDIUM STORING CONTROL PROGRAM THEREFOR

BACKGROUND OF THE INVENTION

1. Field of the Invention

The present invention relates to a printing apparatus, a server, a printing system, a control method for the printing apparatus, and a storage medium storing a control program therefore, which are used to execute printing. Particularly, the present invention relates to the printing system that executes printing using the server on a network when the printing apparatus executes printing according to a print job generated by an information processing apparatus.

2. Description of the Related Art

Generally, when an information processing apparatus like a host computer sends a print job to a printing apparatus like a printer device to execute printing, it is necessary to install software such as a printer driver to the host computer. At the side of the host computer, various items related to printing, for example, a sheet size, the number of copies, a layout, etc. are set up using the printer driver (print setting).

Incidentally, when printing with application software that operates on the host computer, the execution of the print setting generates a print job having the print setting concerned on the host computer. The host computer sends the print job to the printing apparatus, and then, the printing apparatus generates an image (printing data) according to the print setting that the print job concerned has and prints the image.

It should be noted that some printers print images (printing data) that are generated in the host computer and have been transmitted as print jobs.

A typical and well used print setting is beforehand set as an initial state in the printer driver installed in the host computer. Generally, this is called a default setting.

However, some users always want to use a specific print setting rather than the default setting. In this case, since the users need to change the default setting whenever they instruct printing, the printing will be very troublesome.

Accordingly, an operating system (OS) has a function (a print setting holding function) to hold the print setting used for the printing as a general print setting in preparation for the case where a user would like to apply a different print setting from the default setting by the printer driver. It should be noted that the OS used here is the Windows (registered trademark) of Microsoft Corp., for example.

The above-mentioned print setting holding function enables the user to always print with the general print setting without changing the print setting whenever an application program issues the print instruction.

Some application programs, which are provided with print buttons, execute printing when the user pushes the print buttons even if the user does not instruct printing using the print setting screens that are provided by the printer drivers.

There is a technique that enables to change the print setting information that the print driver holds without opening the print setting screen in order to improve user's convenience (for example, see Japanese Laid-Open Patent Publication (Kokai) No. 2005-49950 (JP 2005-49950A)).

Incidentally, a server on a network like the Internet may perform at least a part of an image forming process rather than only a printing device performs the image generation process (printing process) in recent years. Particularly, what is called cloud computing is known as service by which the server on the network performs a part of the image generation process.

When using a cloud computing environment for a printing environment, a device such as a printing apparatus supports only a basic function about printing. And the server on the network (the server is also referred to as a cloud, hereinafter) supports an additional function (an extended function). The use of the cloud computing environment enables to constitute the device like the printing apparatus at low cost and to construct the printing environment that adds the extended functions to the device.

Even if the cloud computing environment is used, the host computer generates the basic setting UI (user interface) screen about the above-mentioned basic function and displays it on a display.

In this case, an extended setting UI screen about the extended function is generated as an HTML file by the cloud. Then, the host computer displays this extended setting UI screen as one screen of the printer driver by a Web browser function.

It should be noted that the basic setting UI screen and the extended setting UI screen may be collectively called print setting UI screens.

As mentioned above, the printer driver that operates on the host computer holds the print setting set up once on the host computer. Therefore, when the print setting UI screen is displayed, the print setting that has set up at the last time is displayed.

When the printing is executed without opening the print setting UI screen (without displaying), the printing is executed with the print setting concerned.

However, the host computer holds only a basic setting (a basic print setting) that uses the basic function. Concerning an extended setting (an extended print setting) that uses the extended function, the host computer merely displays the extended setting UI screen generated by the cloud as the Web browser. The host computer does not hold the extended setting. Therefore, there is a problem that the print setting returns to the default setting after the printing even if the extended setting is performed with the extended setting UI screen.

Therefore, after printing with a certain extended print setting, even if the user wants to print with the same print setting, the user must perform the extended print setting at every printing. When the application program, which can instruct printing without displaying the print setting UI screen containing the print button, is used, the printing is always executed with the default setting.

SUMMARY OF THE INVENTION

The present invention provides a printing apparatus, a server, a printing system, a control method for the printing apparatus, and a storage medium storing a control program therefor, which are capable of making effective use of the extended setting set up once without performing the extended setting each time, and are capable of improving user's convenience.

Accordingly, a first aspect of the present invention provides a printing apparatus that is connected to an information processing apparatus that instructs printing execution, that is connected to a server via a network, and that executes printing according to a print job generated by the information processing apparatus, comprising a request unit configured to request an extended print setting from the server when receiving a request of the extended print setting that extends a predetermined basic print setting from the information processing apparatus, a holding unit configured to hold extended print setting information showing the extended print setting corresponding to the printing apparatus received from the server in response to the request, and a sending unit configured to send the extended print setting information held by the holding unit to the information processing apparatus.

Accordingly, a second aspect of the present invention provides a server that is connected to an information processing apparatus and a printing apparatus via a network and that generates printing data according to a print job generated by the information processing apparatus, comprising a generation unit configured to generate extended print setting information showing an extended print setting corresponding to the printing apparatus, when a request of the extended print setting that extends a basic print setting predetermined in the information processing apparatus is sent to the printing apparatus according to a user's operation and when the request of the extended print setting is received from the printing apparatus, and a sending unit configured to send the extended print setting information to the printing apparatus.

Accordingly, a third aspect of the present invention provides a printing system having the printing apparatus according to the first aspect and the server according to the second aspect.

Accordingly, a fourth aspect of the present invention provides a control method for a printing apparatus that is connected to an information processing apparatus that instructs printing execution, that is connected to a server via a network, and that executes printing according to a print job generated by the information processing apparatus, comprising a request step of requesting an extended print setting from the server when receiving a request of the extended print setting that extends a predetermined basic print setting from the information processing apparatus, a holding step of holding extended print setting information showing the extended print setting corresponding to the printing apparatus received from the server in response to the request, and a sending step of sending the extended print setting information held in the holding step to the information processing apparatus.

Accordingly, a fifth aspect of the present invention provides a non-transitory computer-readable storage medium storing a control program causing a computer to execute a control method for a printing apparatus that is connected to an information processing apparatus that instructs printing execution, that is connected to a server via a network, and that executes printing according to a print job generated by the information processing apparatus, the method comprising a request step of requesting an extended print setting from the server when receiving a request of the extended print setting that extends a predetermined basic print setting from the information processing apparatus, a holding step of holding extended print setting information as holding extended setting information when the extended print setting information showing the extended print setting corresponding to the printing apparatus is received from the server in response to the request, and a sending step of sending the holding extended setting information to the information processing apparatus.

According to the present invention, since the printing apparatus holds not only the basic print setting but also the extended print setting, when the extended print setting is made once, it is not necessary to set up each time.

Even for an application program that can instruct printing without opening a driver screen, it becomes possible to reflect not only the basic print setting but also the extended print setting to printing. This improves user's convenience.

Further features of the present invention will become apparent from the following description of exemplary embodiments with reference to the attached drawings.

BRIEF DESCRIPTION OF THE DRAWINGS

FIG. 9 is a view showing an example of user data (registration information) registered into the cloud shown in FIG. 1.

FIG. 17 is a view showing an example of a data structure of a print job generated by the local host shown in FIG. 1.

DESCRIPTION OF THE EMBODIMENTS

Hereafter, an example of a printing system according to an embodiment of the present invention will be described with reference to the attached drawings. Hereafter, the printing system using cloud computing will be described. In the description, a server (a server computer) that stands on a network like the Internet may be called a cloud. In this printing system, a function (i.e., an extended function) that is not supported by a printing apparatus like a printer device is achieved using the cloud. It should be noted that a setting that can be processed by the printing apparatus is called a basic setting (a basic print setting) and a setting by the cloud is called an extended setting (an extended print setting).

Figure 1:
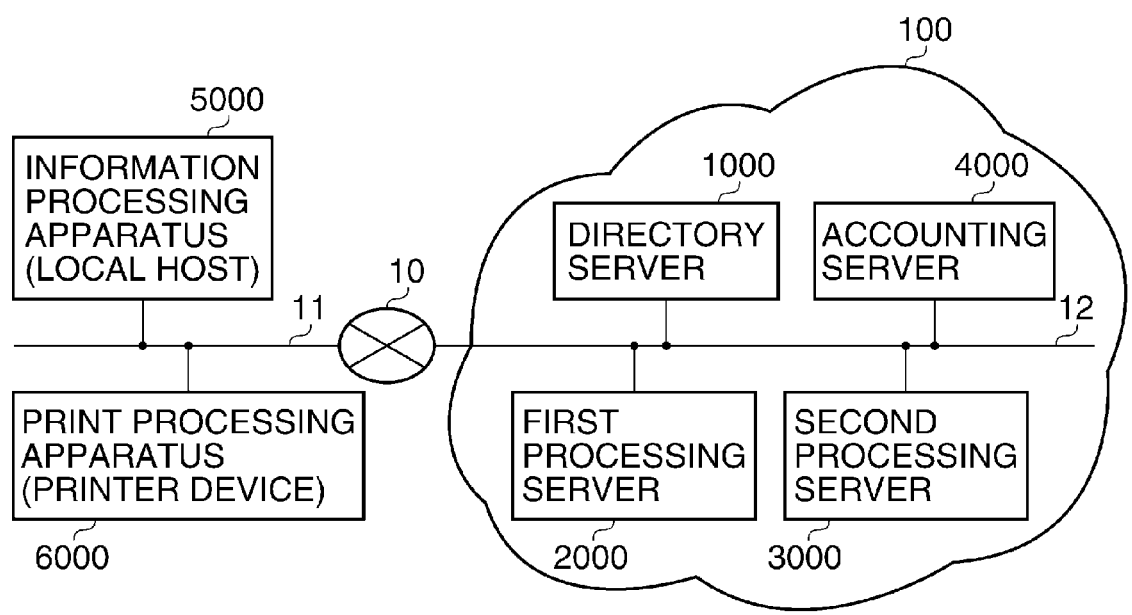
FIG. 1 is a block diagram schematically showing an example of a printing system according to an embodiment of the present invention.

FIG. 1 is a block diagram schematically showing an example of the printing system according to the embodiment of the present invention.

The printing system shown in FIG. 1 has an information processing apparatus 5000 like a local host computer, and a print processing apparatus (referred to as a printing apparatus, simply) 6000 like a printer device. The information processing apparatus 5000 and the print processing apparatus 6000 are mutually connected via a local interface 11, such as a network or a USB. In the illustrated example, although the one print processing apparatus 6000 is shown, the system may include a plurality of print processing apparatuses.

It should be noted that the information processing apparatus 5000 has a network interface like a LAN, and can connect to the Internet 10. Similarly, the print processing apparatus 6000 has a network interface like a LAN, and can connect to the Internet 10.

In the illustrated example, the information processing apparatus 5000 and the print processing apparatus 6000 are connected to the Internet 10, and a plurality of clouds (server system) exist on the Internet 10. In the illustrated example, the only one cloud 100 is shown.

In the illustrated example, the cloud 100 has a directory server 1000, a first processing server 2000, a second processing server 3000, and an accounting server 4000. The directory servers 1000, the first processing server 2000, the second processing server 3000, and the accounting server 4000 are mutually connected via a network 12.

The directory server 1000 receives a job (a print job) from the information processing apparatus 5000 or the print processing apparatus 6000 via the Internet 10. The first and second processing servers 2000 and 3000 process according to settings (job settings) designated by the directory server 1000 and the print job.

In the illustrated example, although the cloud 100 has the first and second processing servers 2000 and 3000 only, the number of processing servers increases according to the number of the functions that are provided by the cloud 100. The accounting server 4000 performs accounting according to the print job.

Hereafter, the information processing apparatus 5000 is called the local host 5000, and the print processing apparatus 6000 is called the printer device 6000. The above-mentioned servers that operate on the cloud 100 are collectively called a server.

As mentioned above, the local host 5000 and the printer device 6000 in a user's environment are connected to the cloud 100 via the Internet 10, which forms the printing system.

Figure 2:
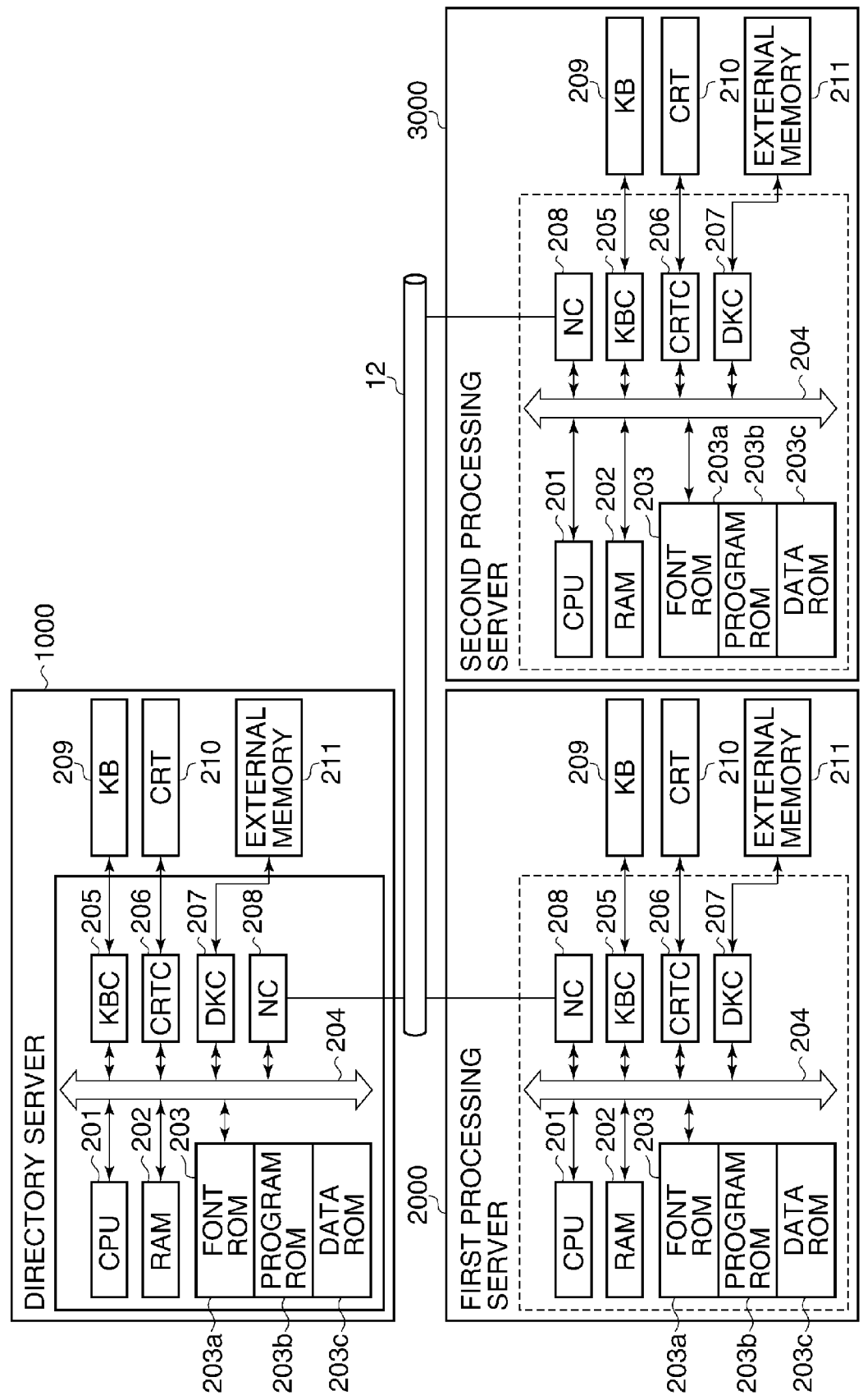
FIG. 2 is a block diagram schematically showing an example of a hardware configuration of a cloud (a server) shown in FIG. 1.

FIG. 2 is a block diagram schematically showing an example of a hardware configuration of the cloud (the server) 100 shown in FIG. 1. It should be noted that the accounting server 4000 is omitted in FIG. 2.

As shown in FIG. 2, the directory server 1000 has a CPU (a Central Processing Unit) 201, a RAM (a Random Access Memory) 202, and a ROM (a Read Only Memory) section 203. The ROM section 203 is provided with a font ROM 203a, a program ROM 203b, and a data ROM 203c.

Further, the directory server 100 is provided with a keyboard controller (KBC) 205, a CRT controller (CRTC) 206, a disk controller (DKC) 207, and a network controller (NC) 208. These components are mutually connected via a system bath 204.

The KBC 205 controls key inputs from a keyboard (KB) 209 and a pointing device (not shown). The CRTC 206 controls indications by a CRT display (CRT) 210. The DKC 207 controls accesses to an external memory 211, such as a hard disk (HD), a floppy (registered trademark) disk (FD), etc., which stores a boot program, various applications, user files, editing files, etc.

The NC 208 is connected to the first and second processing servers 2000 and 3000 and the accounting server 4000 via the network 12. The NC 208 controls communications with the first and second processing servers 2000 and 3000 and the accounting server 4000.

The CPU 201 operates according to a control program (an operating system (OS)) stored in the program ROM 203b or the external memory 211. And the CPU 201 performs a job distribution process according to a job reception program etc. that are stored in the program ROM 203b or the external memory 211. That is, the CPU 201 performs the process that distributes the received job to one of the first and second processing servers 2000 and 3000 and the accounting server 4000.

When performing the job distribution process etc., the various data used in the job distribution process is stored in the data ROM 203c or the external memory 211. It should be noted that the RAM 202 is used as a main memory of the CPU 201, a work area, etc.

The CPU 201 generally controls the components connected to the system bus 204.

Since the hardware configuration of each of the first and second processing servers 2000 and 3000 is the same as that of the directory server 1000, the same reference numerals are used for the same components. It should be noted that a job processing program is stored in the program ROM 203b or the external memory 211 in the first and second processing servers 2000 and 3000.

Figure 3:
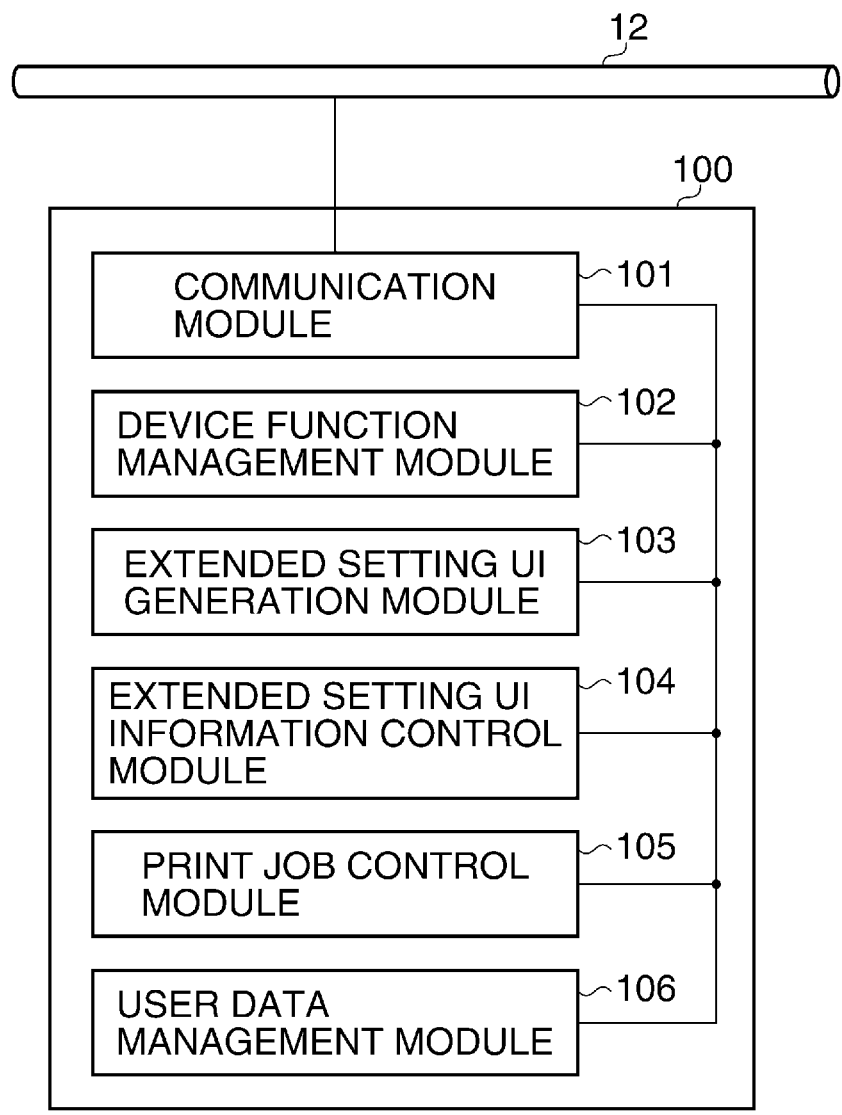
FIG. 3 is a block diagram schematically showing an of a software configuration of the cloud (the server) shown in FIG. 1.

FIG. 3 is a block diagram schematically showing an of a software configuration of the cloud (the server) 100 shown in FIG. 1. The functions of the software are shown in FIG. 3. And these functions are executed by the CPUs 201 of the directory server 1000 and the first and second processing servers 2000 and 3000. The case where the directory server 1000 and the first and second processing servers 2000 and 3000 cooperate as the cloud 100 will be described hereafter.

As shown in FIG. 3, the software that operates on the cloud 100 has a communications module 101, a device function management module 102, an extended setting UI generation module 103, an extended setting UI information control module 104, a print job control unit 105, and a user data management module 106.

The communication module 101 performs a receiving process and a sending process of various data. The device function management module 102 receives throughput information (printer device information) of the printer device 6000 via the communication module 101, and determines the function of the printer device according to the throughput information. The extended setting UI generation module 103 generates extended setting UI information (it is also called extended print setting information) according to the function of the printer device 6000 obtained by the device function management module 102.

The extended setting UI information control module 104 provides the printer device 6000 with the extended setting UI information (server extended setting information) via the communication module 101 while holding the extended setting UI information (the extended print setting information). The print job control unit 105 receives a print job via the communication module 101.

The print job control unit 105 applies image processing to the print job based on the extended setting UI information held by the extended setting UI information control module 104, and generates printing image data (it is also called printing data). Then, the print job control unit 105 sends the printing image data to the applicable printer device 6000 via the communication module 101.

It should be noted that the user data management module 106 manages a list of printer devices registered according to contracts to use the server (a device list). It will be mentioned later.

Figure 4:
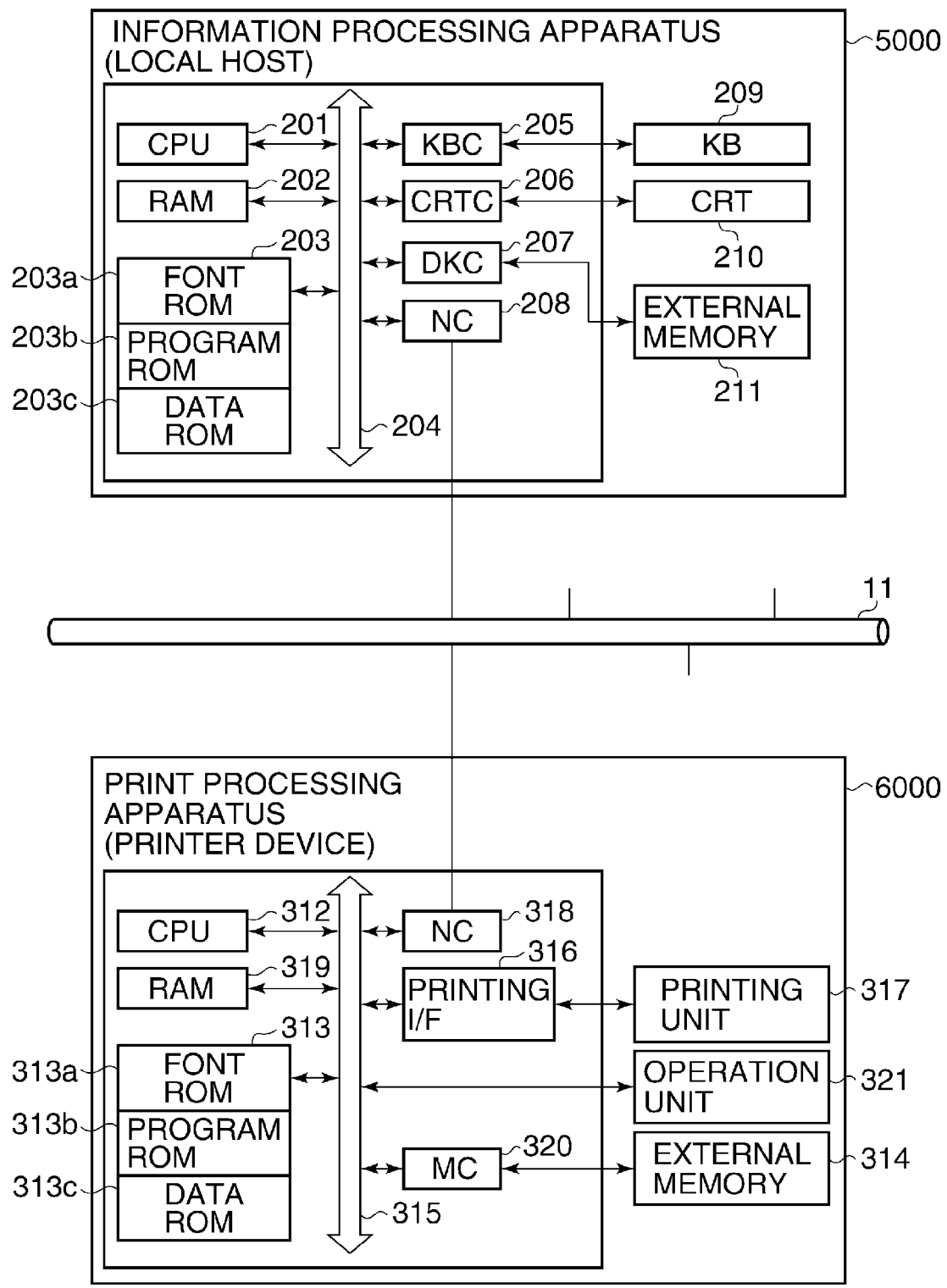
FIG. 4 is a block diagram schematically showing an example of hardware configurations of a local host and a printer device shown in FIG. 1.

FIG. 4 is a block diagram schematically showing an example of hardware configurations of the local host 5000 and the printer device 6000 shown in FIG. 1.

As shown in FIG. 4, the local host 5000 has the same hardware configuration as the directory server 1000. In the local host 5000 shown in FIG. 3, the same reference numerals are attached to the hardware components that are the same as the hardware components shown in FIG. 2.

In the local host 5000 shown in FIG. 4, an application program, a printer control command generating program, etc. are stored in the program ROM 203b or the external memory 211. And the CPU 201 performs a document data generation process to generate document data in which figures, images, characters, tables (spreadsheets etc. are included), etc. are intermingled according to these programs. Further, the CPU 201 performs a generation process of the print job about the document data.

In the local host 5000, the operating system (OS) etc. that are the control programs of the CPU 201 are stored in the program ROM 203b or the external memory 211. The font ROM 203a or the external memory 211 stores font data etc. that are used in the print job generation process about the above-mentioned document data.

It should be noted that the data ROM 203c or the external memory 211 stores various data used for performing the document data generation process, the print job generation process, etc.

In the local host 5000, the NC 208 is connected to the printer device 6000 and the cloud 100 (FIG. 1) via the network 11, and controls communications with the printer device 6000 and the cloud 100.

It should be noted that the CPU 201 executes a process for developing (rasterizing) outline fonts onto a display information RAM set on the RAM 202, for example. This enables the CPU 201 to provide WYSIWYG (What You See Is What You Get) on the CRT 210.

On the basis of commands directed by a mouse cursor (not shown) that is displayed on the CRT 210, the CPU 201 opens various registered windows and executes various data processes. When executing the printing process, a user can make the setting of the printer device 6000 by opening the window about a print setting.

In FIG. 4, the printer device 6000 has a CPU 312, a ROM section 313, a printing unit I/F 316, an NC 318, a RAM 319, and a memory controller (MC) 320 as a hardware configuration. The ROM section 313 is provided with a font ROM 313a, a program ROM 313b, and a data ROM 313c.

The NC 318 is connected to the network 11. A printing unit (a printer engine) 317 is connected to the printing unit I/F 316, and an external memory 314 is connected to the MC 320. The components of the printer device 6000 are mutually connected via a system bus 315, and an operation unit 321 is further connected to the system bus 315.

The CPU 312 outputs an image signal (image data) to the printing unit 317 as output information by executing the control program etc. stored in the program ROM 313b or the external memory 314. The font ROM 313a stores font data etc. that are used for generating image data.

The data ROM 313c stores various data etc. that are used in the host computer 5000 when the external memory 314 does not exist, for example. It should be noted that the external memory 314 may store user's printing data.

The CPU 312 can communicate with the host computer 5000 and the cloud 100 via the NC 318, can send the various data held in the printer device 6000 to the host computer 5000 and the cloud 100, for example. It should be noted that the RAM 319 is used as a main memory of the CPU 312, a work area, etc.

Figure 5:
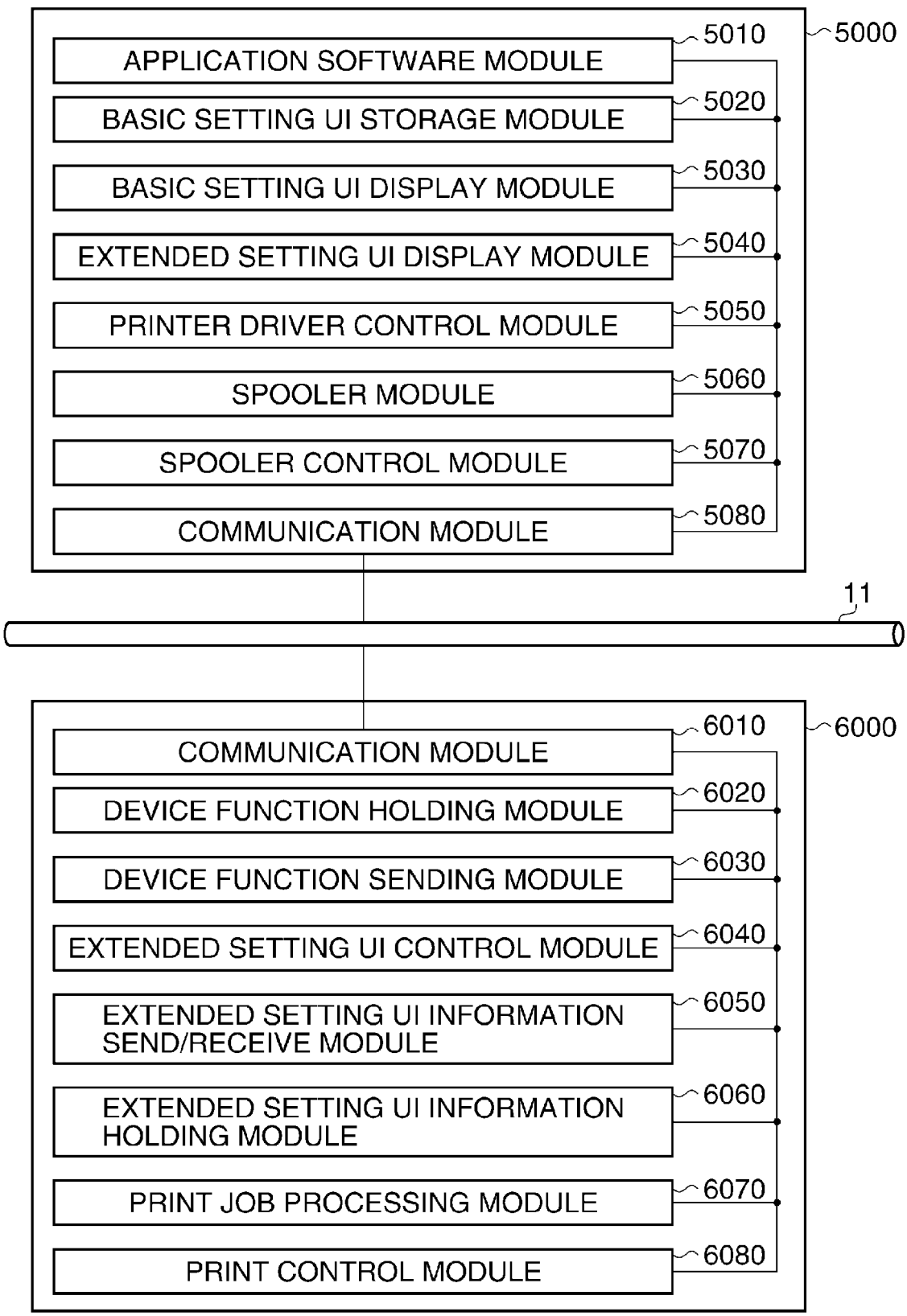
FIG. 5 is a block diagram schematically showing an example of software configurations of the local host and the printer device shown in FIG. 1.

FIG. 5 is a block diagram schematically showing an example of software configurations of the local host 5000 and the printer device 6000 shown in FIG. 1. FIG. 5 shows the functions of the software that the local host 5000 and the printer device 6000 have. And these functions are executed by the CPU 201 of the local host 5000 and the CPU 312 of the printer device 6000.

As shown in FIG. 5, the software that operates on the local host 5000 includes an application software module 5010, a basic setting UI storage module 5020, a basic setting UI display module 5030, an extended setting UI display module 5040, a printer driver control module 5050, a spooler module 5060, a spooler control module 5070, and a communication module 5080.

The software that operates on the printer device 6000 includes a communication module 6010, a device function holding module 6020, a device function sending module 6030, an extended setting UI control module 6040, an extended setting UI information send/receive module 6050, an extended setting UI information holding module 6060, a print job processing module 6070, and a print control module 6080.

In the local host 5000, the communication module 5080 performs a receiving process and a sending process of various data. The application software module 5010 generates an original image that should be printed. The basic setting UI storage module 5020 holds basic setting information generated by the printer driver (not shown). The basic setting UI display module 5030 displays the basic setting information generated by the printer driver on the CRT 210 (FIG. 2) as a basic setting information screen.

The extended setting UI display module 5040 has a Web browser function, and displays the extended setting UI information formed as an HTML file mentioned later on the CRT 210 as an extended setting UI screen. The printer driver control module 5050 is installed on the local host 5000, and receives drawing data (image data) that is requested to print via the application software module 5010. The printer driver control module 5050 converts the basic setting information set in the printer driver and the drawing data into a data format that is applicable to the printer device 6000, and generates a print job. Further, the printer driver control module 5050 sends a request of extended setting UI (an extended setting request) to the printer device 6000, and receives the extended setting UI information.

The spooler module 5060 holds the print job generated by the printer driver control module 5050. The spooler control module 5070 sends the print job held by the spooler module 5060 to the printer device 6000 via the communication module 5080.

In the printer device 6000, the communication module 6010 performs a receiving process and a sending process of various data. The device function holding module 6020 holds the function data that the printer device 6000 can process. The device function sending module 6030 sends the function data held by the device function holding module 6020 via the communication module 5080.

When a request for the extended setting UI comes from the local host 5000, the extended setting UI control module 6040 sends the request concerned to the cloud 100 via the communication module 6010. The extended setting UI control module 6040 sends the device performance information showing performance of a device to the cloud 100 via the communication module 6010. And the extended setting UI control module 6040 receives the extended setting UI information, and sends the extended setting UI information concerned to the local host 5000 via the communication module 6010.

When receiving the extended setting UI information with a job ID from the local host 5000, the extended setting UI information send/receive module 6050 sends the job ID and the extended setting UI information to the cloud 100 via the communication module 6010.

The extended setting UI information holding module 6060 stores and holds the extended setting UI information. The print job processing module 6070 receives the print job and determines whether the extended setting is available for the job ID included in the print job. If the extended setting UI information is different from the extended setting UI information held by the extended setting UI information holding module 6060, the print job processing module 6070 updates the information of the extended setting UI information holding module 6060.

The print control module 6080 applies the printing process to the printing image data generated by the print job processing module 6070. The print control module 6080 applies the printing process to the printing image data received from the cloud 100 as mentioned later.

Here, a pre-process that is performed before printing will be described.

Figure 6:
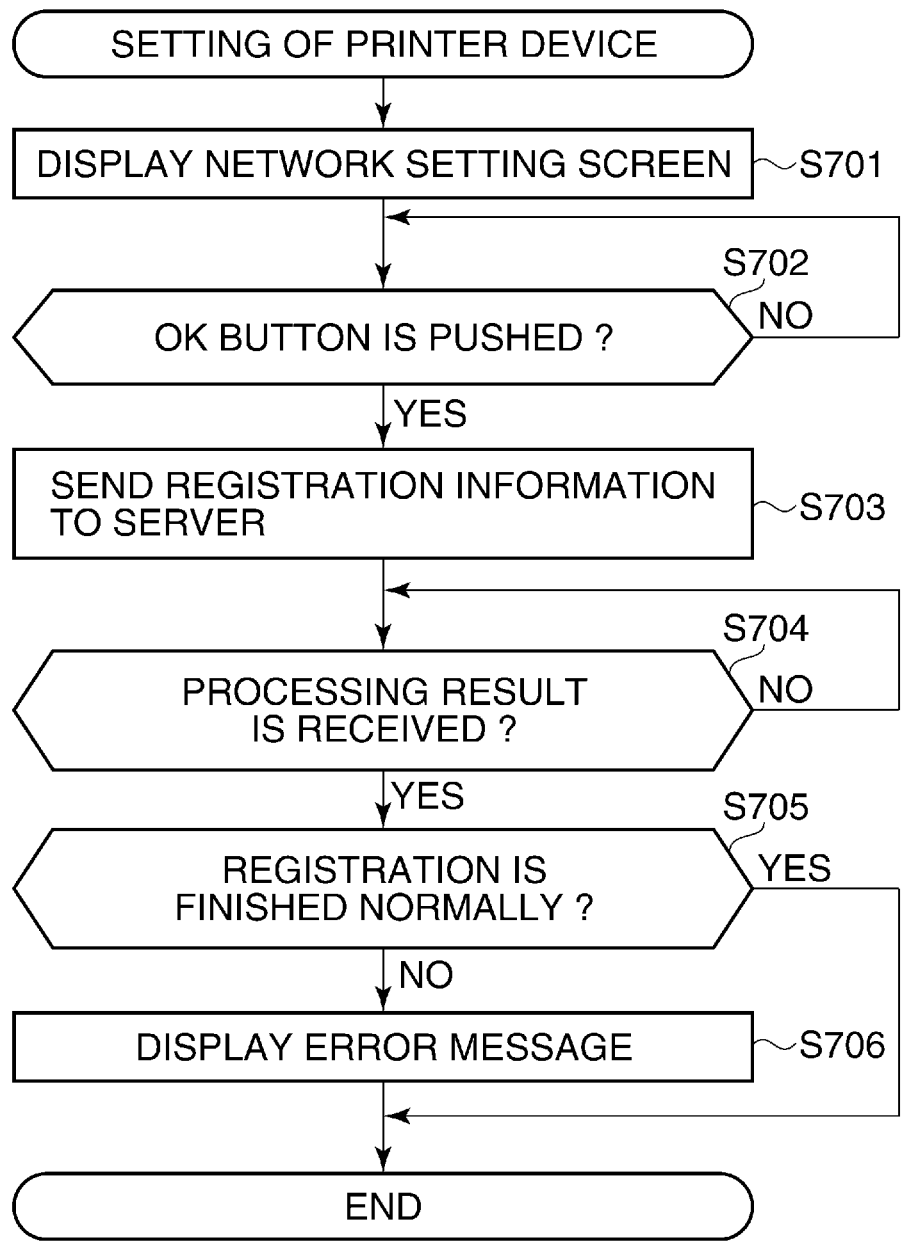
FIG. 6 is a flowchart showing a setting process executed in the printer device shown in FIG. 1.

FIG. 6 is a flowchart showing a setting process executed in the printer device 6000 shown in FIG. 1. When the printer device 6000 is started, the CPU 201 displays a network setting screen on the CRT 210 (FIG. 4) in the local host 5000, for example.

Figure 7:
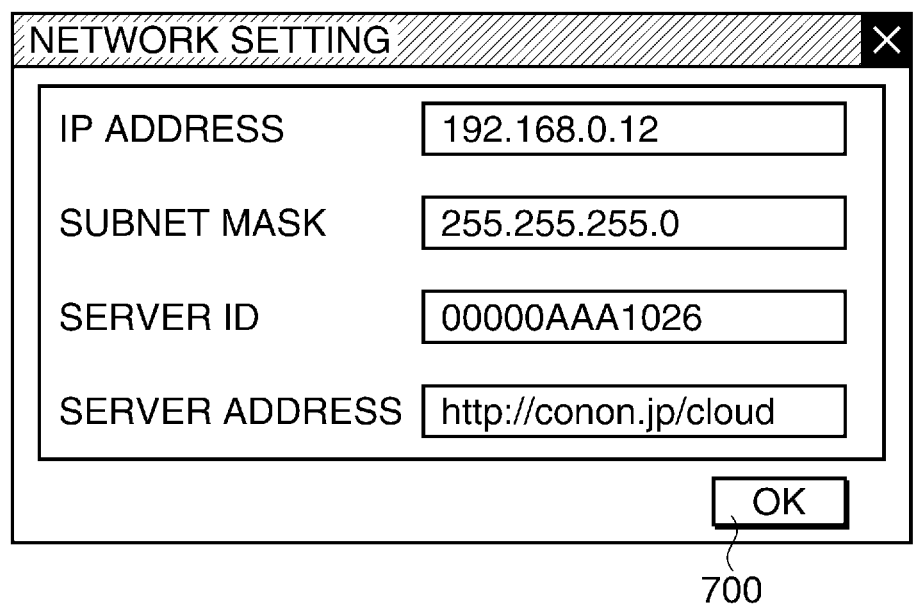
FIG. 7 is a view showing an example of a network setting display screen displayed on a CRT shown in FIG. 4.

FIG. 7 is a view showing an example of the network setting display screen displayed on the CRT 210 shown in FIG. 4. As shown in FIG. 7, a title of the network setting is displayed on the network setting display screen. An IP address, a subnet mask, a server system ID (identification information), and a server system address are displayed in addition to an OK button 700 on the network setting display screen.

As shown in FIG. 4, FIG. 6, and FIG. 7, when the printer device 6000 is started, the CPU 201 of the local host 5000 displays the network setting screen on the CRT 210 (step S701). And the CPU 201 monitors whether the OK button 700 was depressed (step S702). A user makes the network setting for using the cloud (the server) 100 in the network setting screen, for example.

That is, the user inputs the IP address, the subnet mask, and the server system ID as the network setting information in the network setting screen. When the user pushes the OK button 700 in the network setting screen after setting the network setting information (YES in step S702), the CPU 201 stores the network setting information into the data ROM 203*c*, for example. Then, the CPU 201 sends registration information that includes the network setting information to the cloud (server system) 100 (step S703). If the OK button 700 is not pushed (NO in step S702), the CPU 201 waits.

The above-mentioned registration information includes a device name, a device type, an IP address, a subnet mask, and a device ID, for example.

Next, the CPU 201 determines whether a notice of a registration processing result is received from the cloud 100 (step S704). If the notice of the registration processing result is not received (NO in step S704), the CPU 201 waits until the notice of the registration processing result is received.

On the other hand, when receiving the notice of the registration processing result (YES in step S704), the CPU 201 determines whether the registration processing result shows a completion of the registration (step S705). That is, the CPU 201 determines whether the registration has completed normally. When the registration processing result shows the completion of the registration (YES in step S705), the CPU 201 finishes the setting process for the device.

If the registration processing result does not show the completion of the registration (NO in step S705), the CPU 201 display an error message on the CRT 210 (step S706), and finishes the setting process for the device.

Figure 8:
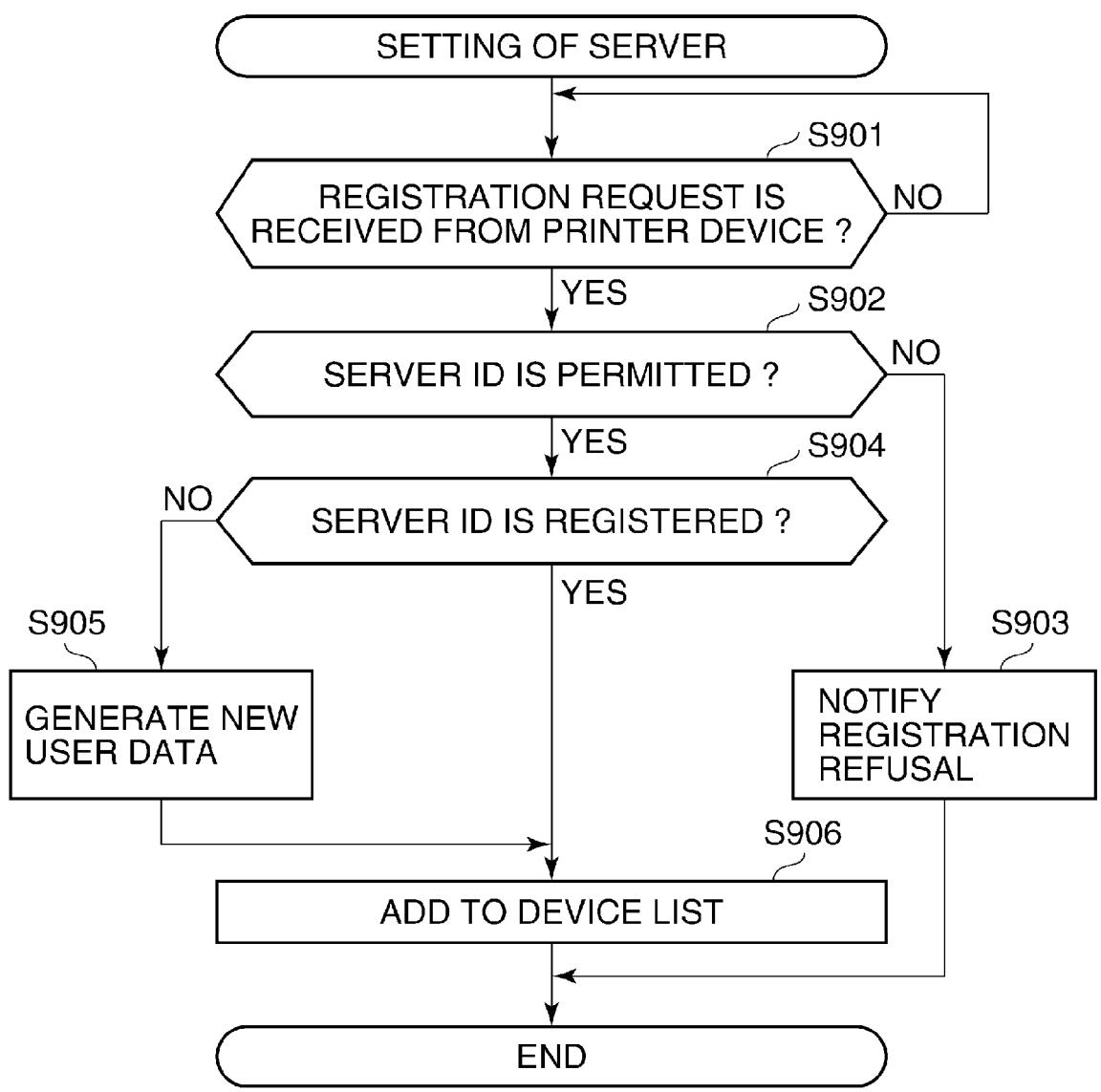
FIG. 8 is a flowchart showing a setting process executed in the cloud (the server) shown in FIG. 1.

FIG. 8 is a flowchart showing a setting process executed in the cloud (the server) 100 shown in FIG. 1.

As shown in FIG. 2 and FIG. 8, the CPU 201 in the directory server 1000 determines whether a registration request is received from the printer device 6000 (step S901). When the registration request is not received from the printer device 6000 (NO in step S901), the CPU 201 waits.

On the other hand, when the registration request is received from the printer device 6000 (YES in step S901), the CPU 201 determines whether the server ID (the identification information) has been permitted based on the registration information (step S902). That is, the CPU 201 determines whether the server system ID of the registration request is permitted.

If the server ID of the registration request is not permitted (NO in step S902), the CPU 201 notifies a registration refusal to the printer device 6000 (step S903). Then, the CPU 201 finishes the server setting process.

If the server ID of the registration request is permitted (YES in step S902), the CPU 201 determines whether the server ID concerned has been registered (step S904). It should be noted that the permitted server ID has been beforehand set in the data ROM 203*c* etc.

If the server ID of the registration request is not registered (NO in step S904), the CPU 201 generates a new user data (step S905).

FIG. 9 is a view showing an example of the user data (the registration information) registered into the cloud 100 shown in FIG. 1. As shown in FIG. 9, the user data (the registration information) has a column of a device name, and a model, an IP address, and a subnet mask are set corresponding to the device name (for example, a printer, an MFP (Multifunctional Peripheral Device)). The server ID is written to the user data.

Then, the CPU 201 adds the newly created user data to the device list (step S906), and finishes the setting process for the server. It should be noted that the above-mentioned device list is stored in the data ROM 203*c*, for example.

On the other hand, when the server ID of the registration request has been registered (YES in step S904), the CPU 201 proceeds with the process to the step S906, adds the registration information to the device list as the user data, and finishes the setting process for the server.

Figure 10:
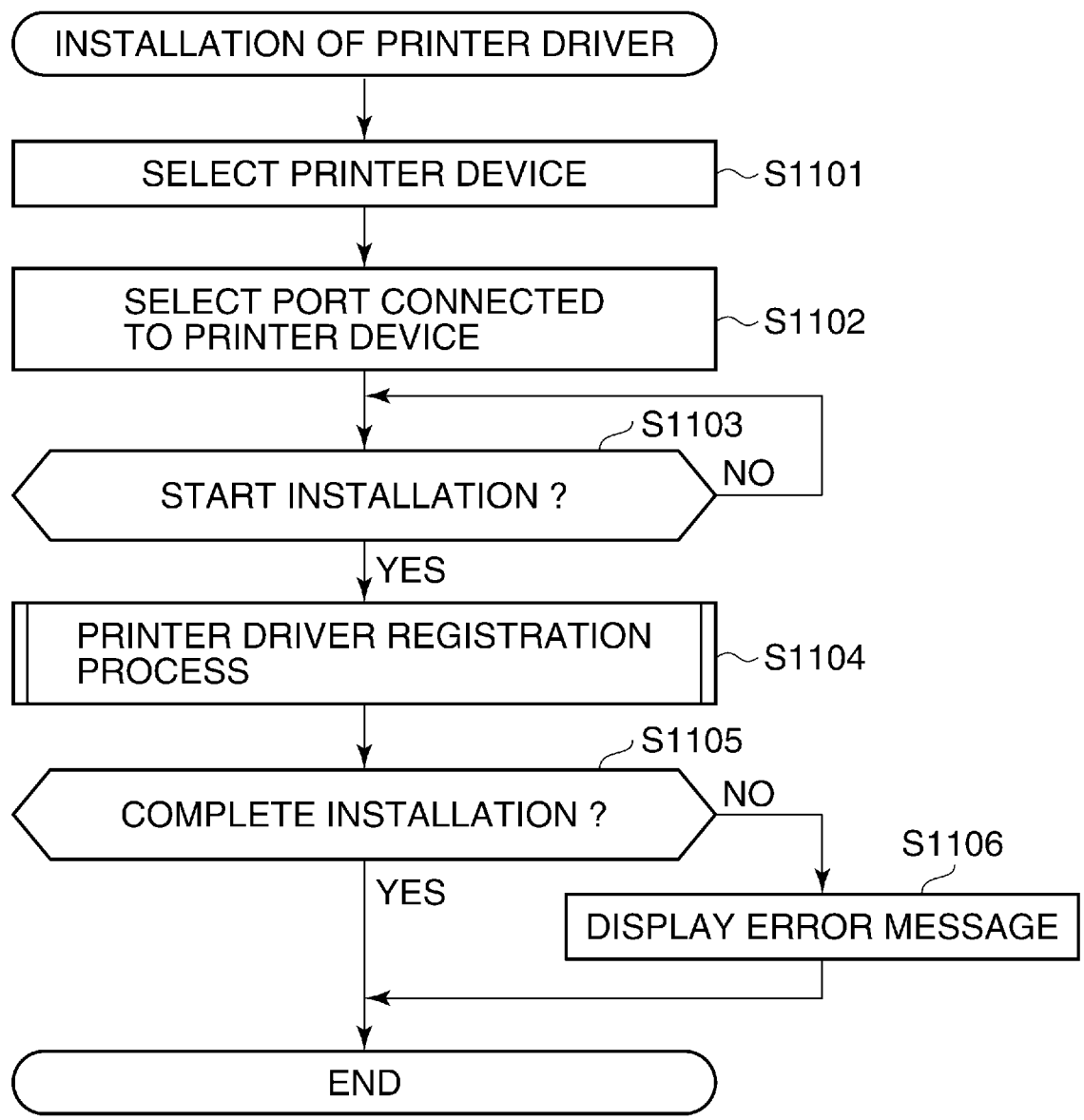
FIG. 10 is a flowchart showing a printer driver installation process executed in the local host shown in FIG. 1.

FIG. 10 is a flowchart showing a printer driver installation process executed in the local host 5000 shown in FIG. 1.

As shown in FIG. 4 and FIG. 10, when an installer is started on the local host 5000 (i.e., the CPU 201), a user selects the printer device 6000 to which the printer driver is set up, from among the plurality of printer devices (step S1101).

Next, the CPU 201 selects a port of the local host 5000 that is connected to the selected printer device 6000 (step S1102).

Then, the CPU 201 determines whether the start of installation has been instructed (step S1103).

If the start of installation has not been instructed (NO in step S1103), the CPU 201 waits until the start of installation is instructed. On the other hand, if the start of installation has been instructed (YES in step S1103), the CPU 201 executes a printer driver registration process (step S1104). In this printer driver registration process, a printer driver module is copied onto the OS, for example. Various settings, such as association of the port connected to the printer device 6000 with the printer driver, that enable to generate a print job are made. And the printer driver is set up.

Next, the CPU 201 determines whether the installation of the printer driver has been completed normally (step S1105). When the printer driver has been installed normally (YES in step S1105), the CPU 201 finishes the printer driver installation process.

On the other hand, when the printer driver has not been installed normally (NO in step S1105), the CPU 201 displays an error message showing installation failure on the CRT 210 (step S1106). Then, the CPU 201 finishes the printer driver installation process.

It should be noted that the installation method of the printer driver shown in FIG. 10 is an example, and various installation methods of printer drivers provided by the OS are available.

Next, a process at the time of printing will be described. First of all, flows of the process among the local host 5000, the cloud 100, and the printer device 5000 shown in FIG. 1 will be outlined.

In the illustrated printing system, a function that is not supported by the printer device 6000 is achieved by using the cloud 100. The local host 5000 will send the print job concerned to the printer device 6000, if a print job is generated. Receiving the print job, the printer device 6000 determines whether the print job includes an extended setting for performing the image processing by the cloud 100. And if it is determined that the print job includes the extended setting, the printer device 6000 sends the print job with the extended setting information to the cloud 100, and requests the image processing.

Receiving the extended setting information and the print job, the cloud 100 executes an image generation process based on the extended setting information to generate printing image data. The cloud 100 sends this printing image data to the printer device 6000. The printer device 6000 executes printing according to this printing image data.

A situation in which the cloud 100 performs a background patterning process as the extended setting and the printer device 6000 performs a multiple copying process as the basic setting will be described hereafter as an example.

On the other hand, if the print job generated by the local host 5000 includes the basic setting only, the printer device 6000 executes printing based on the received print job.

Next, a process executed until the print setting UI (the print setting screen) is displayed on the local host 5000 will be described.

Figure 11:
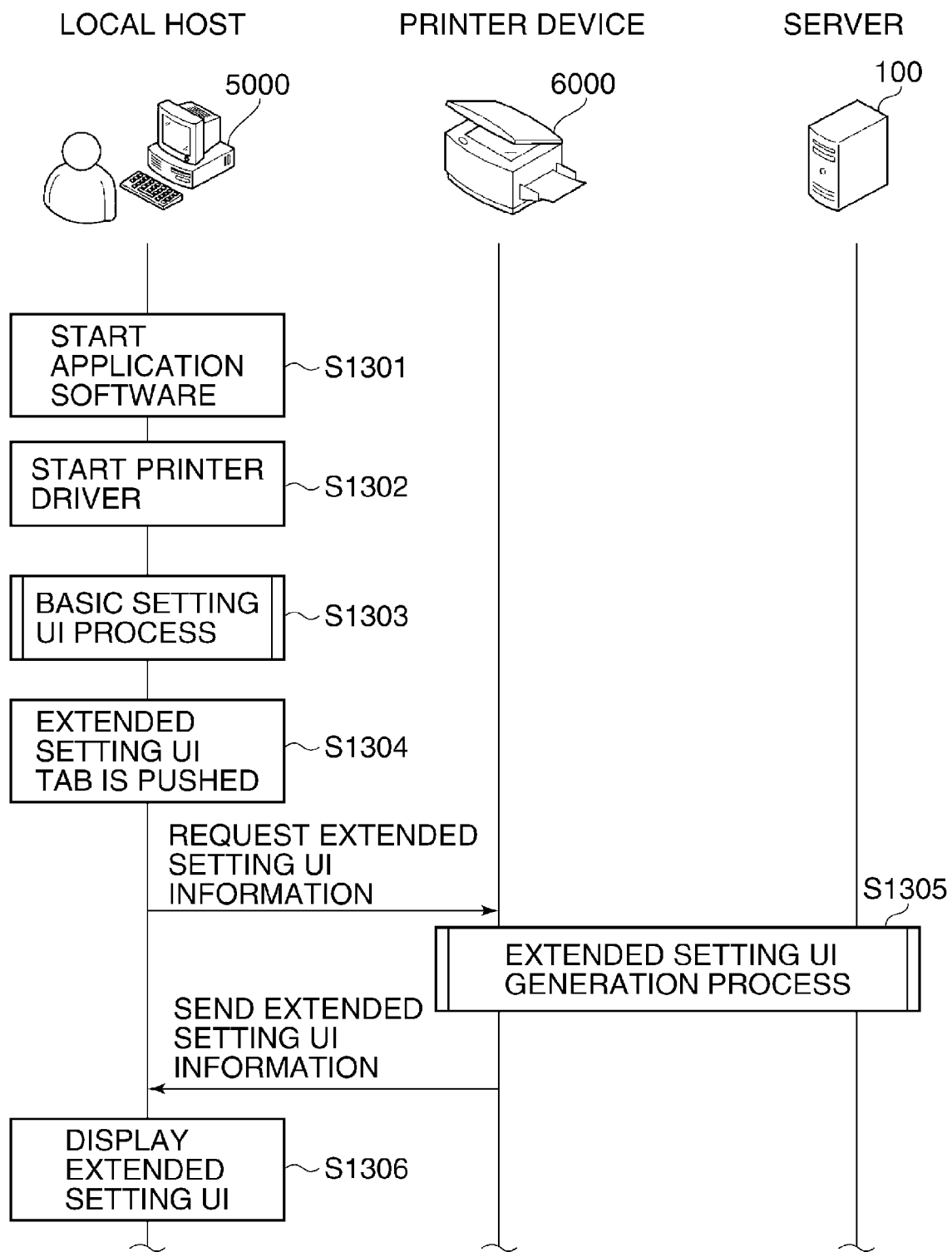
FIG. 11 is a sequential chart showing flows of processes executed until the local host shown in FIG. 1 displays a print setting screen.

FIG. 11 is a sequential chart showing flows of processes executed until the local host shown in FIG. 1 displays a print setting screen.

As shown in FIG. 4, FIG. 5, and FIG. 11, the application software module 5010 pre-installed into the local host 5000 is started (step S1301). When the user creates a printing document and prints it by the printer driver 6000, the printer driver is started (step S1302).

When the printer driver is started, the basic setting UI display module 5030 displays the basic setting UI screen on the CRT 210 first, and a basic setting UI process is performed (step S1303).

Figure 12:
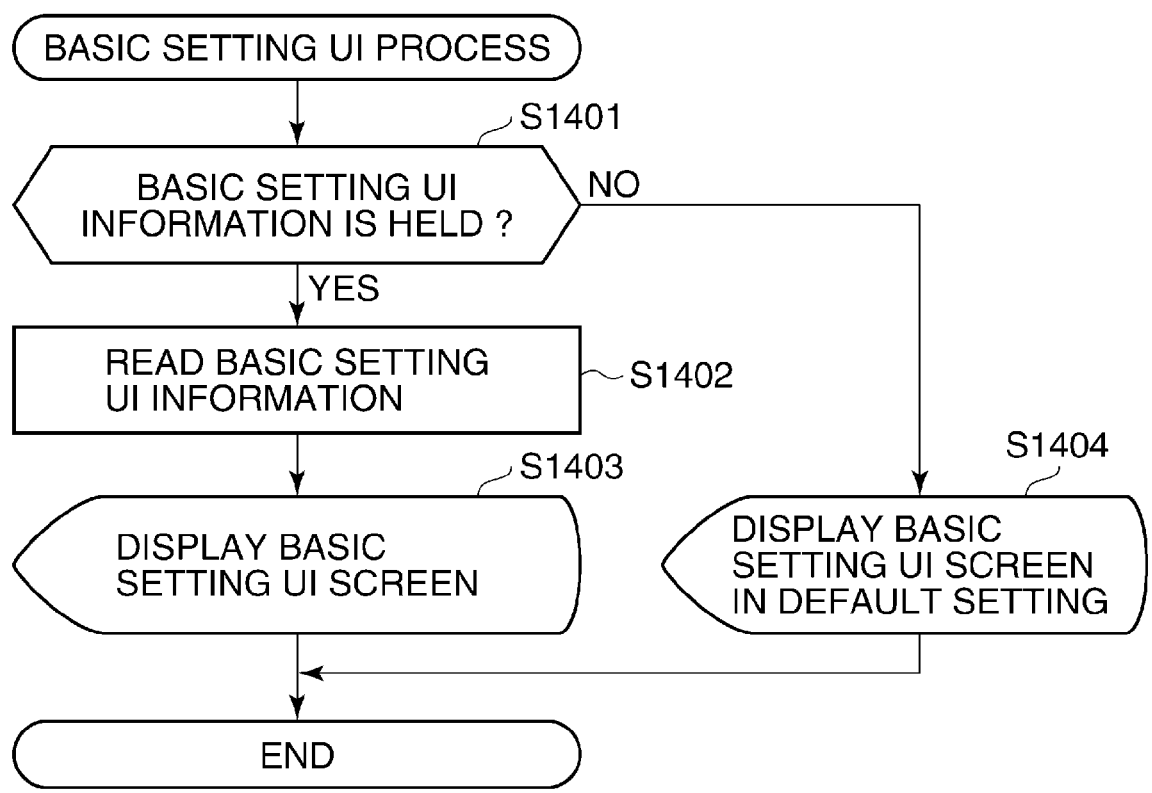
FIG. 12 is a flowchart showing a basic setting UI process shown in FIG. 11.

FIG. 12 is a flowchart showing the basic setting UI process shown in FIG. 11.

First, when the printer driver is started and the print setting UI screen is opened, the basic setting UI display module 5030 checks whether the basic setting information of the printer driver applicable on the local host 5000 is held (step S1401).

If the basic setting information is held (YES in step S1401), the basic setting UI display module 5030 reads the basic setting information concerned from the basic setting UI storage module 4020 (step S1402).

Next, the basic setting UI display module 5030 generates a basic setting UI screen according to the read basic setting information, displays this basic setting UI screen on the CRT 210 (step S1403), and finishes the process.

On the other hand, if the basic setting information is not held (NO in step S1401), the basic setting UI display module 5030 generates a basic setting UI screen according to the default setting that the printer driver has, displays this basic setting UI screen on the CRT 210 (step S1404). Then, the basic setting UI display module 5030 finishes the process.

Figure 13A:
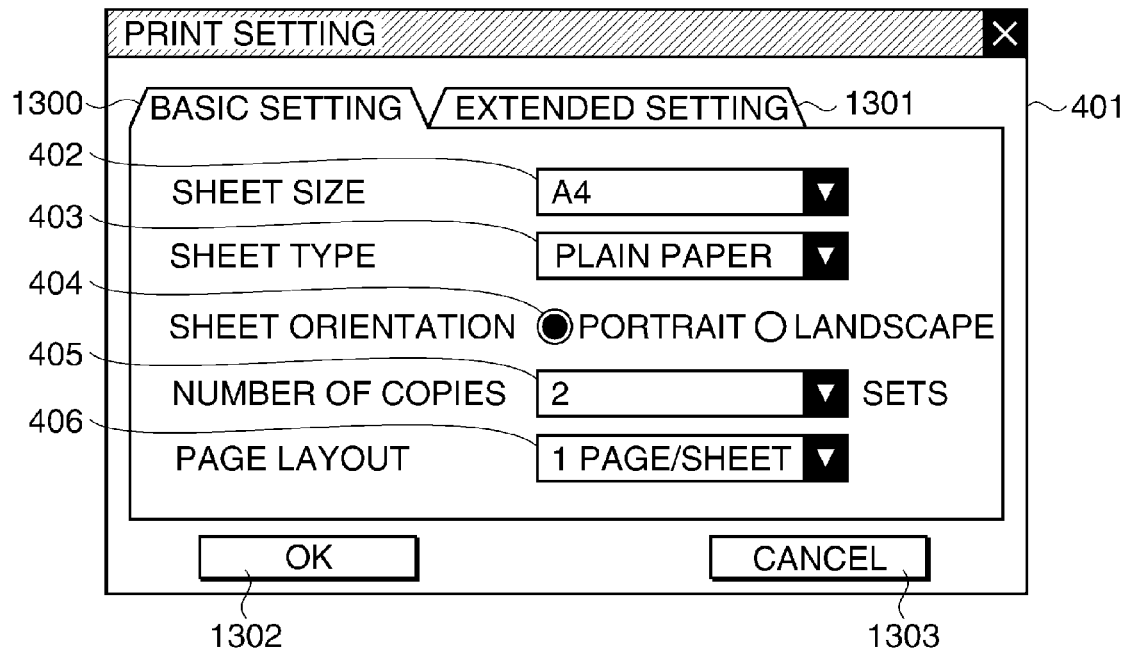
FIG. 13A is a view showing an example of a basic setting UI screen displayed at the time when a basic setting UI tab is pushed in the print setting screen displayed on the local host shown in FIG. 1.
Figure 13B:
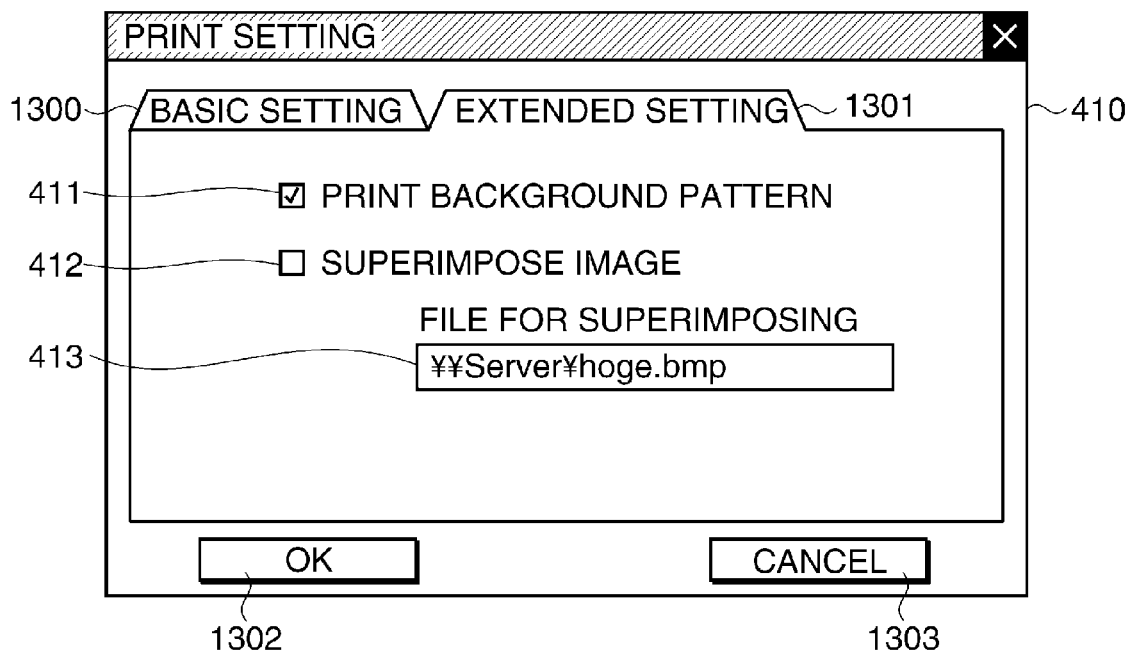
FIG. 13B is a view showing an example of an extended setting UI screen displayed at the time when an extended setting UI tab is pushed in the print setting screen displayed on the local host shown in FIG. 1.

FIG. 13A is a view showing an example of the basic setting UI screen displayed at the time when a basic setting UI tab is pushed in the print setting screen displayed on the local host shown in FIG. 1. FIG. 13B is a view showing an example of the extended setting UI screen displayed at the time when an extended setting UI tab is pushed in the print setting screen displayed on the local host shown in FIG. 1.

As shown in FIG. 13A, the basic setting UI tab 1300 and the extended setting UI tab 1301 are displayed together with the title of print setting in the basic setting UI screen 401. In the basic setting UI screen 401, a column 402 for a sheet size, a column 403 for a sheet type, a column 404 for a sheet orientation, a column 405 for the number of copies, and a column 406 for a page layout are displayed. An OK button 1302 and a cancel button 1303 are displayed at the bottom of the basic setting UI screen 401. The user makes the basic setting concerning printing using the basic setting UI screen 401, for example.

That is, the user inputs the sheet size, the sheet type, the sheet orientation, the number of copies, and the page layout as the basic setting information using the basic setting UI screen 401. Thus, the basic setting is specified beforehand. In this example, the basic setting includes the sheet size, the sheet type, the sheet orientation, the number of copies, and the page layout.

When the user pushes extended setting UI tab 1301 (step S1304) after setting up the basic setting information, the extended setting UI display module 5040 displays the extended setting UI screen 410 shown in FIG. 13B on the CRT 210.

The basic setting UI tab 1300 and the extended UI tab 1301 are displayed together with the title of print setting in the extended setting UI screen 410. In the extended setting UI screen 410, a check box 411 that shows whether or not to print a background pattern and a check box 412 that shows whether or not to superimpose an image are displayed. In the extended setting UI screen 410, a path of an image file to be superimposed can be designated in a file path column 413.

An OK button 1302 and a cancel button 1303 are displayed at the bottom of the extended setting UI screen 410. The user makes the extended setting concerning printing using the extended setting UI screen 410, for example.

In the illustrated example, the user sets the extended setting information by marking the check box 411 in the extended setting UI screen 410 to designate the background pattern print. Although the path of the image file is designated in the file path column 413, since the check box 412 is not marked, the image is not superimposed.

Here, when the user pushes the extended setting UI tab 1301 in the basic setting UI screen 401 shown in FIG. 13A in order to set the background pattern print (step S1304), the local host 5000 requests the extended setting UI information from the printer device 6000.

Receiving the request of the extended setting UI information, the extended setting UI control module 6040 of the printer device 6000 performs an extended setting UI generation process (step S1305). In this case, a content of the extended setting UI generation process differs according to whether the extended setting UI information is held by the extended setting UI information holding module 6060. The extended setting UI information is sent to the local host, and is displayed at the local host (step S1306).

Figure 14:
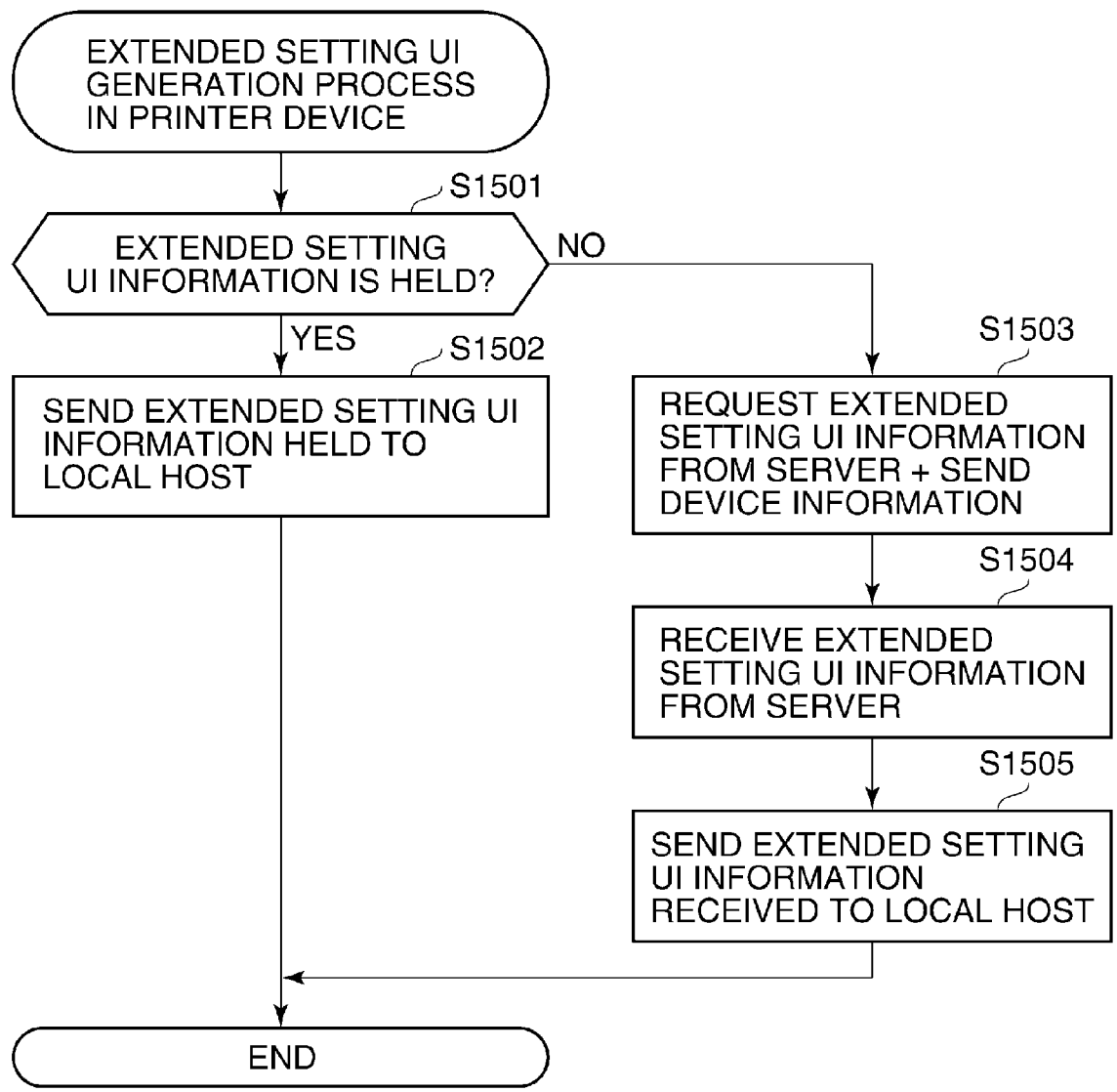
FIG. 14 is a flowchart showing an extended setting UI generation process executed in the printer device shown in FIG. 1.
Figure 15:
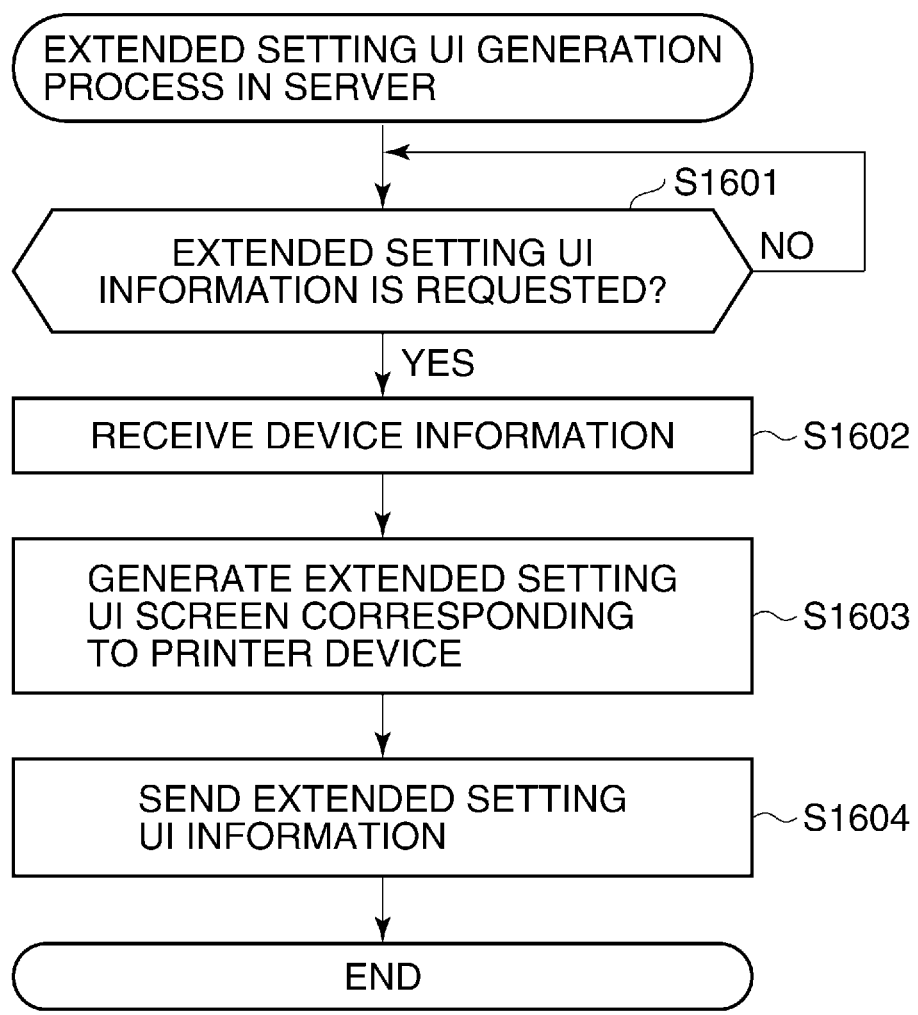
FIG. 15 is a flowchart showing the extended setting UI generation process executed in the cloud (the server) shown in FIG. 1.

Next, the extended setting UI generation process will be described. FIG. 14 is a flowchart showing the extended setting UI generation process executed in the printer device 6000 shown in FIG. 1. FIG. 15 is a flowchart showing the extended setting UI generation process executed in the cloud (the server) 100 shown in FIG. 1.

The process shown in FIG. 14 starts when the printer device 6000 receives the request of the extended setting UI screen from the local host 5000. On the basis of the request, the extended setting UI control module 6040 determines whether the extended setting UI information is held by the extended setting UI information holding module 6060 (step S1501).

When the extended setting UI information is held by the extended setting UI information holding module 6060 (YES in step S1501), the extended setting UI information send/receive module 6050 sends the extended setting UI information concerned to the local host 5000 via the communication module 6010 (step S1502). Then, the printer device 6000 finishes the process.

If the extended setting UI information is not held by the extended setting UI information holding module 6060 (NO in step S1501), the extended setting UI control module 6040 requests the extended setting UI screen from the cloud 100 associated with the printer device 6000 concerned (step S1503). In this case, the extended setting UI control module 6040 sends the printer device information about the printer device 6000 to the cloud 100.

It should be noted that the printer device information may be beforehand notified to the cloud 100 at the time of the registration process described in FIG. 8.

Next, the cloud 100 sends the extended setting UI information to the printer device 6000 as mentioned below in response to the request of the above-mentioned extended setting UI screen. Then, the extended setting UI information send/receive module 6050 in the printer device 6000 receives the extended setting UI information (step S1504). The extended setting UI information holding module 6060 holds the extended setting UI information. The extended setting UI information send/receive module 6050 sends the extended setting UI information concerned to the local host 5000 via the communication module 6010 (step S1505). Then, the printer device 6000 finishes the process.

Next, as shown in FIG. 15, the extended setting UI information control module 104 in the cloud 100 is monitoring the request of the extended setting UI information from the printer device 6000 (step S1601). If the request of the extended setting UI information is not received (NO in step S1601), the extended setting UI information control module 104 continues the above-mentioned monitoring.

On the other hand, when receiving the extended setting UI information (YES in step S1601), the extended setting UI information control module 104 receives the printer device information showing a function and a performance of the printer device 6000 (step S1602). Then, the extended setting UI generation module 103 generates an extended setting UI screen, i.e., extended setting UI information, according to the performance etc. of the printer device 6000 (step S1603).

Next, the extended setting UI information control module 104 sends the extended setting UI information to the printer device 6000 via the communication module 101 (step S1604). Thus, receiving the extended setting UI information, the printer device 6000 notifies the extended setting UI information to the local host 5000, as mentioned above.

The local host 5000 displays the extended setting UI screen (see FIG. 13B) corresponding to the extended setting UI information on the CRT 210 by the Web browser function with which the printer driver is provided.

Figure 16:
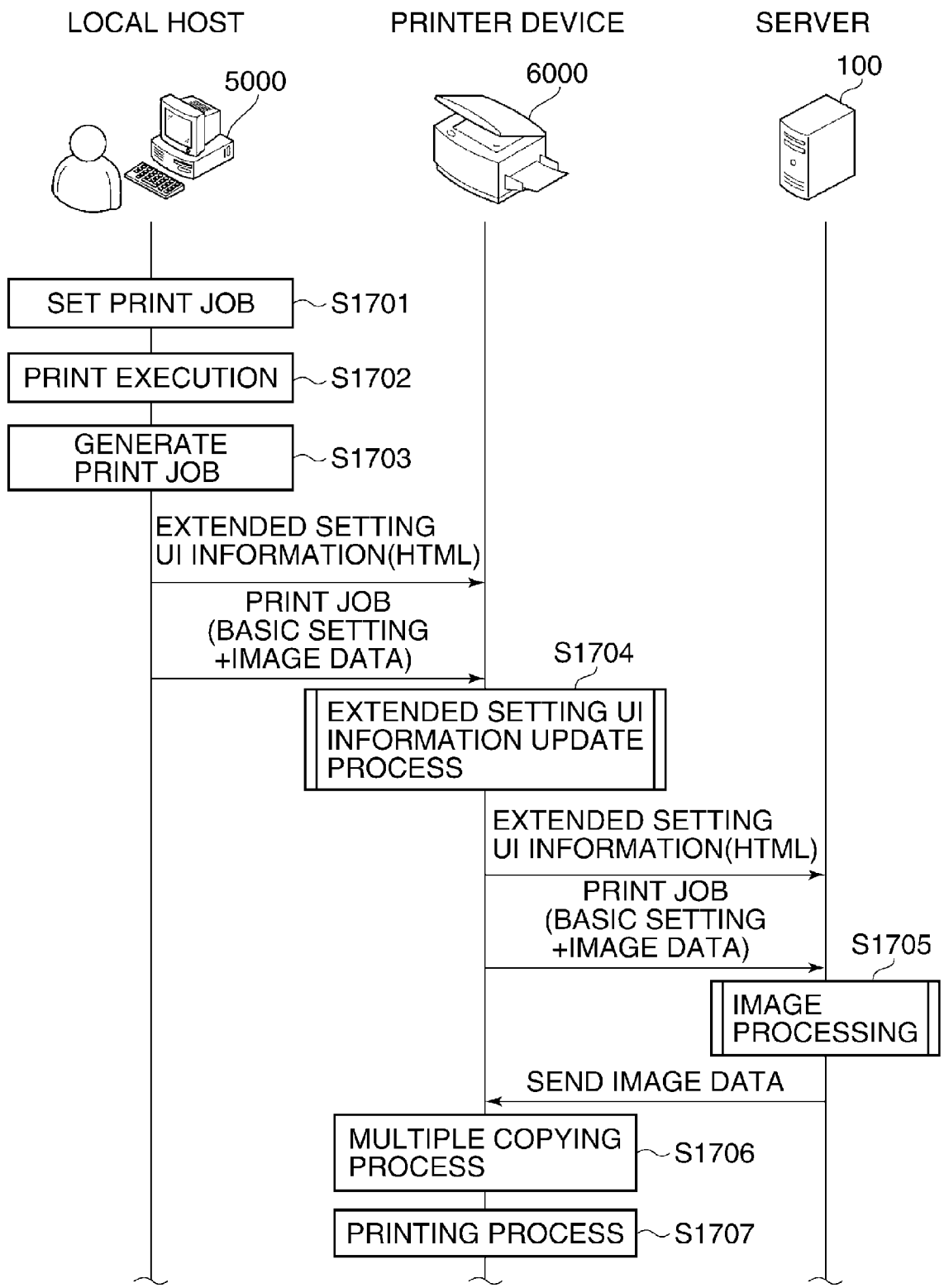
FIG. 16 is a sequential chart showing an example of the printing process in the printing system shown in FIG. 1.

Next, the printing process will be described. FIG. 16 is a sequential chart showing the printing process in the printing system shown in FIG. 1.

As mentioned above, the print setting by the printer driver, i.e., setting of a print job, is performed in the local host 5000 (step S1701). In the illustrated example, "the number of copies=2" is set as the basic setting, and "the background pattern" is set as the extended setting.

Next, a printing execution is instructed in the local host 5000 (step S1702). When the printing execution is instructed, the printer driver generates a print job (step S1703).

FIG. 17 is a view showing an example of a data structure of the print job generated by the local host 5000 shown in FIG. 1.

As shown in FIG. 17, the print job is provided with the job ID, the basic setting UI information (the basic setting), and the printing data. The basic setting includes the sheet size, the sheet type, the sheet orientation, and the number of copies. It should be noted that the extended setting UI information is also provided with the job ID (not shown) as with the basic setting, and the job ID associates the extended setting UI information with the print job.

Next, the local host 5000 sends the extended setting UI information (HTML) and the print job to the printer device 6000. Since the extended setting UI information is displayed by the Web browser display function that the printer driver has as an HTML file, the information is sent to the printer device 6000 as an HTML file using the HTTP.

Next, receiving the extended setting UI information and the print job, the extended setting UI control module 6040 of the printer device 6000 performs an updating process of the extended setting UI information (step S1704).

Figure 18:
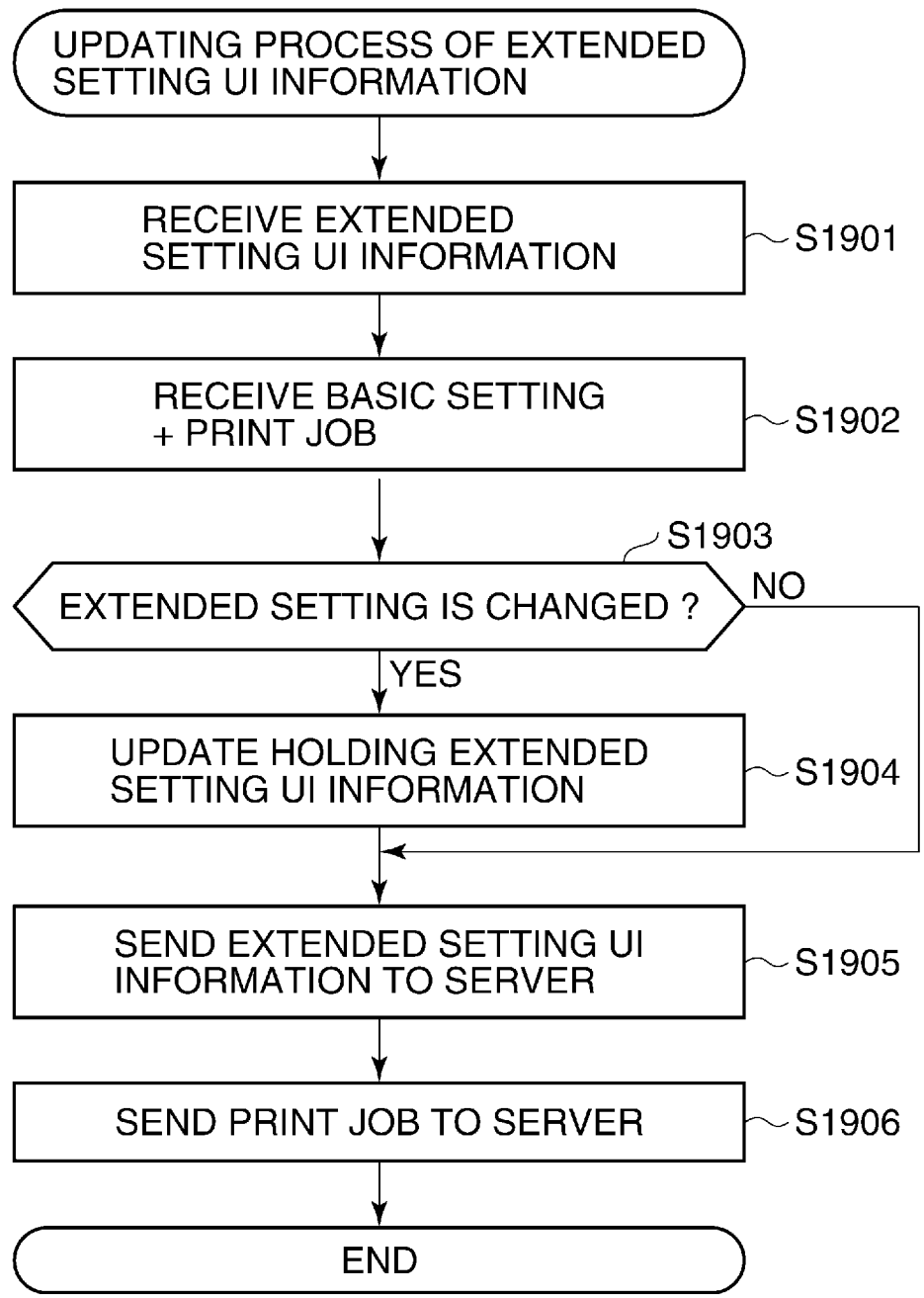
FIG. 18 is a flowchart showing an updating process of the extended setting UI information executed in the printer device shown in FIG. 1.

FIG. 18 is a flowchart showing the updating process of the extended setting UI information executed in the printer device 6000 shown in FIG. 1.

As shown in FIG. 18, the printer device 6000 receives the extended setting UI information (step S1901), and receives the print job (step S1902). Then, the extended setting UI control module 6040 compares the extended setting UI information (referred to as a holding extended setting UI information) held by the extended setting UI information holding module 6060 with the received extended setting UI information (referred to as a reception extension setting UI information) (step S1903). It should be noted that the holding extended setting UI information is also simply called holding extended setting information.

When the holding extended setting UI information differs from the reception extension setting UI information (YES in step S1903), the extended setting UI information control module 6040 substitutes the reception extension setting UI information for the holding extended setting UI information (step S1904).

In the illustrated example, since the "background pattern" is set up as the extended setting, the extended setting UI information is sent to the cloud 100 via the communication module 6010 (step S1905), and the print job is sent to the cloud 100 (step S1906).

If the holding extended setting UI information and the reception extension setting UI information are the same (NO in step S1903), the printer device 6000 proceeds with the process to the step S1905.

When receiving the extended setting UI information and the print job, the print job control unit 105 in the cloud 100 performs a background patterning process to the print job with reference to the extended setting UI information, and generates the printing image data (the image processing: step S1705).

When generating the printing image data, the print job control unit 105 sends the printing image data to the printer device 6000 via the communication module 101.

When receiving the printing image data, the print job processing module 6070 in the printer device 6000 performs the multiple copying process based on the basic setting UI information (step S1706). Then, the print control module 6080 executes the printing process according to the printing image data (step S1707).

It should be noted that it may be determined whether the extended setting is made based on the extended setting UI information received in the step S1901 in FIG. 18. In this case, if the extended setting is not made, since the cloud 100 is not needed to perform the image processing, the printer device 6000 may generate and print an image without sending the print job to the cloud 100.

In FIG. 16, although the printer device 6000 performs the multiple copying process, the cloud 100 may perform the multiple copying process with reference to the basic setting UI information when the cloud 100 generates the printing image data.

Thus, the printer device 6000 holds not only the basic print setting but also the extended print setting when printing using the cloud 100 in the embodiment of the invention. Accordingly, if once the user makes the extended print setting by the local host, the user does not need to set up the extended print setting etc. at every printing.

Next, the case where the printing execution is instructed without changing the print setting (setting of the print job) will be described. For example, this case corresponds to the case where a print button (not shown) with which the application software module 5010 is provided is pushed. When the print button displayed on the CRT 210 is pushed, the print execution is instructed while the printer driver does not display the print setting screen. In this case, the previous print setting is used.

Figure 19:
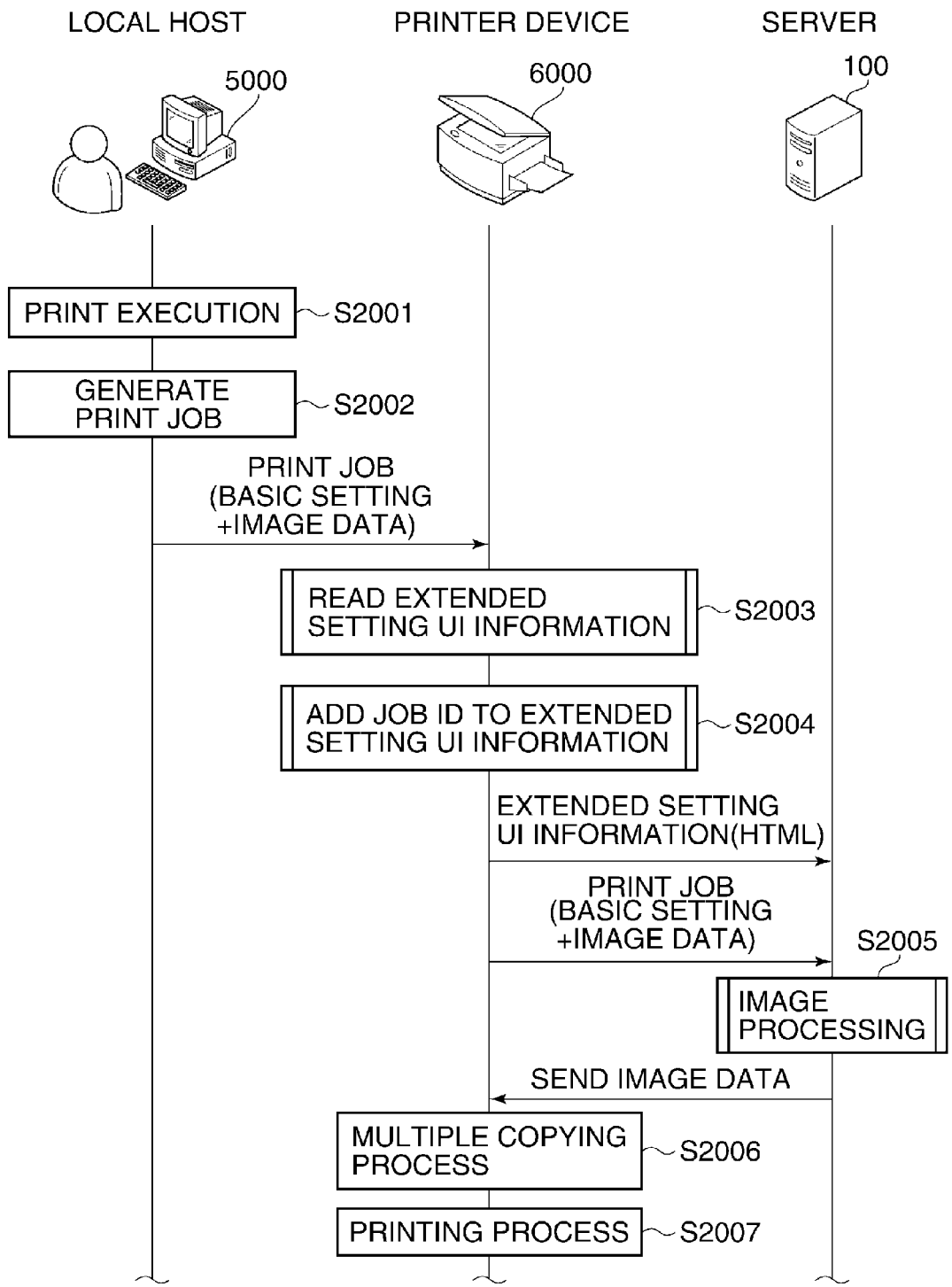
FIG. 19 is a sequential chart showing another example of the printing process in the printing system shown in FIG. 1.

FIG. 19 is a sequential chart showing another example of the printing process in the printing system shown in FIG. 1. Here, it is assumed that "the number of copies=2" has been set as the basic setting and "the background pattern" has been set as the extended setting at the print setting of the last printing.

First, a printing execution is instructed in the local host 5000 (step S2001). When the printing execution is instructed, as mentioned above, the printer driver generates a print job (step S2002). In this case, the basic setting UI information of "the number of copies=2" that has been held by the local host 5000 is added to the print job.

Next, the local host 5000 sends the print job including the basic setting UI information to the printer device 6000. In this case, since the printing execution has been instructed without displaying the print setting screen, the extended setting UI information is not sent to the printer device 6000.

Receiving the print job, the extended setting UI control module 6040 performs a process of reading the extended setting UI information that the extended setting UI information holding module holds (step S2003). Then, the extended setting UI control module 6040 adds the same job ID as the received print job to the read extended setting information (step S2004) in order to associate them.

Next, the extended setting UI information send/receive module 6050 sends the extended setting UI information and the print job to the cloud 100 via the communication module 6010. When receiving the extended setting UI information and the print job, the print job control unit 105 in the cloud 100 performs a background patterning process to the print job with reference to the extended setting UI information, and generates the printing image data (step S2005).

When generating the printing image data, the print job control unit 105 sends the printing image data to the printer device 6000 via the communication module 101. When receiving the printing image data, the print job control unit 6070 in the printer device 6000 performs the multiple copying process based on the basic setting UI information (step S2006), and the print control module 6080 executes the print job according to the printing image data (step S2007).

If it is determined that the extended setting is not made to the extended setting UI information in the step S2003 (i.e., if the cloud 100 is not needed to perform image processing), the printer device 6000 may generate and print an image according to the print job without sending the print job to the cloud 100.

In FIG. 19, although the printer device 6000 performs the multiple copying process, the cloud 100 may perform the multiple copying process with reference to the basic setting UI information when the cloud 100 generates the printing image data.

As mentioned above, according to the embodiment of the present invention, even for an application program that can instruct printing without opening a driver screen, it becomes possible to reflect not only the basic print setting but also the extended print setting to printing. This improves user's convenience.

Although the embodiment of the present invention has been described, the present invention is not limited to the above-mentioned embodiment, and contains various modifications within a scope as long as the concept of the present invention is not deviated.

For example, the functions of the above embodiment may be achieved as a print control method, and the print control method may be selectably executed by the local host 5000, the cloud 100, and the printer device 6000.

Further, the functions of the above embodiment may be achieved as a print control program, and the print control program may be selectably executed by the local host 5000, the cloud 100, and the printer device 6000.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-030097, filed on Feb. 15, 2010, which is hereby incorporated by reference herein in its entirety.

What is claimed is:

1. A printing apparatus capable of communicating with an information processing apparatus and a server apparatus that executes extended process extending predetermined basic process, the printing apparatus comprising:
   a first transmitting unit configured to transmit display information to the information processing apparatus, the display information generated by the server apparatus and being used for setting regarding the extended process,
   a first receiving unit configured to receive from the information processing apparatus first printing data, basic setting information regarding the basic process and extended setting information regarding the extended process that is set at the information processing apparatus based on the display information transmitted by the first transmitting unit;
   a holding unit configured to hold the extended setting information received by the first receiving unit;
   a second transmitting unit configured to transmit the first printing data and the extended setting information both received by the first receiving unit to the server apparatus;
   a second receiving unit configured to receive printing data generated through subjecting the first printing data transmitted by the second transmitting unit to the extended process executed by the server apparatus based on the extended setting information transmitted by the second transmitting unit;
   a processing unit configured to process the printing data received by the second receiving unit based on the basic setting information received by the first receiving unit; and
   a printing unit configured to print the printing data processed by the processing unit, wherein
   in a case where the first receiving unit receives second printing data different from the first printing data and the basic setting information but does not receive the extended setting information, the second transmitting unit transmits the second printing data and the extended setting information held by the holding unit to the server apparatus.

2. The printing apparatus as claimed in claim 1, further comprising requesting unit configured to make request to the server apparatus for transmitting the display information according to request for the display information to execute setting regarding the extended process by the information processing apparatus, wherein
   the first transmitting unit transmits the display information generated by the server apparatus according to the request made by the requesting unit to the server apparatus.

3. The printing apparatus as claimed in claim 1, wherein the display information is generated by the server apparatus based on function information of the printing apparatus.

4. The printing apparatus as claimed in claim 1, wherein the display information is generated as a HTML file.

5. The printing apparatus as claimed in claim 1, wherein the basic setting information includes at least one of a sheet size, a sheet type, a sheet orientation, the number of copies, and a page layout.

6. The printing apparatus as claimed in claim 1, wherein the extended setting information includes at least one of information on whether or not to set background pattern print and information on whether or not to superimpose an image.

7. The printing apparatus as claimed in claim 1, wherein the basic setting information is set using a display generated by a printer driver installed in the information processing apparatus.

8. The printing apparatus as claimed in claim 7, wherein the information processing apparatus holds the basic setting information set using the display generated by the printer driver.

* * * * *